United States Patent
Gozzi et al.

(10) Patent No.: US 12,472,804 B2
(45) Date of Patent: Nov. 18, 2025

(54) LIFTABLE ROOF FOR RECREATIONAL VEHICLES

(71) Applicant: LCI ITALY S.R.L., Florence (IT)

(72) Inventors: Luigi Gozzi, Colle Val D'elsa (IT);
Paolo Bernardeschi, Ponsacco (IT);
Riccardo Minuti, San Miniato Basso (IT)

(73) Assignee: LCI ITALY S.R.L., Florence (IT)

( * ) Notice: Subject to any disclaimer, the term of this patent is extended or adjusted under 35 U.S.C. 154(b) by 505 days.

(21) Appl. No.: 17/981,960

(22) Filed: Nov. 7, 2022

(65) Prior Publication Data
US 2023/0146506 A1    May 11, 2023

(30) Foreign Application Priority Data
Nov. 8, 2021    (IT) .......................... 102021000028307

(51) Int. Cl.
*B60J 7/16*    (2006.01)
*B32B 5/24*    (2006.01)
(Continued)

(52) U.S. Cl.
CPC .............. *B60J 7/1664* (2013.01); *B32B 5/245* (2013.01); *B60J 7/165* (2013.01); *B60P 3/343* (2013.01);
(Continued)

(58) Field of Classification Search
CPC ........ B60J 7/165; B60J 7/1657; B60J 7/0084; B60J 7/08; B60J 7/16; B60J 7/1642; B60J 7/1664; B60P 3/34; B60P 3/343; B60P 3/38; B60P 3/39; B62D 29/005; B32B 5/245; B32B 7/12; B32B 15/046; B32B 19/045
(Continued)

(56) References Cited

U.S. PATENT DOCUMENTS

| | | | |
|---|---|---|---|
| 3,582,130 A * | 6/1971 | Borskey | B60J 7/165 296/176 |
| 4,103,958 A | 8/1978 | Parent | |
| 4,262,956 A * | 4/1981 | Kellam | B60J 7/165 296/26.07 |
| 4,362,258 A * | 12/1982 | French | B60P 3/34 296/160 |

(Continued)

FOREIGN PATENT DOCUMENTS

| | | | | |
|---|---|---|---|---|
| CH | 663 584 | | 12/1987 | |
| DE | 102021104861 A1 * | | 9/2021 | ............... B60P 3/34 |

(Continued)

OTHER PUBLICATIONS

Italian Search Report dated Jul. 4, 2022 issued in Italian Patent Application No. 102021000028307, 10 pp.

*Primary Examiner* — Amy R Weisberg
*Assistant Examiner* — Denise Lynne Esquivel
(74) *Attorney, Agent, or Firm* — NIXON & VANDERHYE P.C.

(57) ABSTRACT

A liftable roof for recreational vehicles includes a lower frame stably connectable to the upper surface of the recreational vehicle, handling structure connected to the lower frame, and an upper lid operatively connected to the handling structure. The handling structure is configured for moving the lid with respect to the frame between a first lowered position and a second raised position. The upper lid includes a single panel with a first resistant upper layer and a second layer made of thermo-insulating material fixed on a lower surface of the first upper layer.

12 Claims, 5 Drawing Sheets

(51) Int. Cl.
    *B32B 7/12*     (2006.01)
    *B60P 3/34*     (2006.01)
    *B60P 3/39*     (2006.01)
    B32B 15/04      (2006.01)
    B32B 19/04      (2006.01)

(52) U.S. Cl.
    CPC . *B60P 3/39* (2013.01); *B32B 7/12* (2013.01); *B32B 15/046* (2013.01); *B32B 19/045* (2013.01)

(58) Field of Classification Search
    USPC ...... 296/26.04, 26.05, 26.06, 174, 160, 164, 296/165, 191, 210, 211
    See application file for complete search history.

(56) References Cited

U.S. PATENT DOCUMENTS

| | | | | |
|---|---|---|---|---|
| 4,981,319 | A * | 1/1991 | Gerzeny | B60J 7/165 296/99.1 |
| 6,325,447 | B1 * | 12/2001 | Kuo | B60P 3/341 296/99.1 |
| 11,648,869 | B2 * | 5/2023 | Freshour | B60P 3/34 296/173 |
| 11,708,036 | B2 * | 7/2023 | Wei | B32B 3/263 296/165 |

FOREIGN PATENT DOCUMENTS

| | | |
|---|---|---|
| GB | 2556350 | 5/2018 |
| WO | WO 2021/186270 | 9/2021 |

\* cited by examiner

LIFTABLE ROOF FOR RECREATIONAL VEHICLES

CROSS-REFERENCE TO RELATED APPLICATION

This application claims priority of Italian Patent Application No. 102021000028307 filed Nov. 8, 2021, the entire contents of which are hereby incorporated by reference in this application.

BACKGROUND AND SUMMARY

This invention relates to a liftable roof for recreational vehicles.

More specifically, the invention relates to a roof for vehicles such as vans, mini-vans, camper vans, or the like, also known as "recreational vehicles", that is to say, suitable for transporting persons and for leisure time and being such as to comprise an internal living space.

More specifically, with reference to the van-type recreational vehicles, for which the solution according to the described embodiments can be applied, the living space inside the above-mentioned van-type recreational vehicles is usually small; for the reason, the need is always felt to increase the available space as much as possible.

The vans are vehicles suitable for camping, which substantially maintain the bodywork of the van for commercial use from which they derive.

Various types of accessories, such as windows, fly screens, ventilation grilles, access doors, service doors, etc., etc. are applied stably to the bodywork of the commercial van, in order to convert it into a van-type recreational vehicle.

In addition to the above changes to the exterior bodywork of the van, clearly, the furniture in the interior space is also installed.

Recreational vehicles of the van type, exist both in "low" and "high" versions, depending on the height of the rear cabin of the van from which they derive.

The described embodiments can be applied on both types of versions.

The liftable roofs therefore allow the internal space of the vehicle to be considerably increased, for example by providing an additional space which can be used as a "night zone" compartment for the users.

There are currently various solutions of liftable roofs for recreational vehicles.

All the prior art solutions comprise a lower frame which is fixed to the original ceiling of the van (on which there is an opening for access from the cabin of the van), and an upper lid is connected to the lower frame by means of mechanisms for movement by levers and tie rods.

The movement mechanisms allow the upper lid to be moved between a first lowered configuration, that is to say, non-operational (with the vehicle travelling), in which the lid is positioned in direct contact with the lower frame, and a second raised configuration, that is to say, operational (with the vehicle parked), in which the above-mentioned additional space is obtained.

The upper lid is generally connected by a flexible awning to the lower frame.

The awning makes it possible to obtain a closed space also laterally and it can be used by the user.

According to a first prior art solution of liftable roofs, the upper lid and the lower frame are made of plastic material such as, for example, ABS and PMMA.

According to this solution, both the upper lid and the lower frame are made by coupling two moulded parts in order to obtain at least one empty gap inside it.

The presence of a gap allows both a passage useful for service cables or aeration ducts to be obtained and to obtain, without, however, great results, a sort of thermal insulation with the outside environment.

A further prior art solution comprises the use of LFI (Long Fiber Injection) technology for making at least the upper lid of the liftable roof.

This technology makes it possible to obtain a lid, which has a layer of ABS\PMMA on the outside and an inner coating of polyurethane foam.

The production process comprises a first step in which the lid made of ABS/PMMA is moulded and a subsequent step of casting and moulding, directly inside the previous ABS\PMMA thermoform of the above-mentioned polyurethane foam.

However, the liftable roofs of known type, while allowing the internal space of a recreational vehicle to be increased, have considerable drawbacks.

A first major drawback, common to all the prior art solutions of the liftable roof, is due to the fact that because of the material with which they are made, and the method by which they are produced, the production process is very expensive and complex both with regards to the necessary time, materials and machinery.

A second major drawback is due to the poor, if not practically absent, thermal insulation obtained by means of the upper lid, both in the case of the presence of a gap and in the case in which there is the polyurethane foam moulded on the ABS\PMMA.

Another drawback is due to the fact that, when the outer layer is made of ABS\PMMA it is not possible to produce it in dark colours, such as black, since, if subjected to heat sources, such as, for example, sunlight, there is a risk of significant plastic deformation which may adversely affect the integrity of the liftable roof.

Another drawback of liftable roofs of known type, but no less important, is due to the fact that these considerably worsen the overall appearance of the shapes of the van from which the recreational vehicle derive.

This is due in particular to the shape of the upper lid, which has a lateral edge designed to cover entirely the lower frame.

More in detail, the edge of the roofs of known type extends and forms part of the upper lid. The extension goes from the top downwards with respect to the surface of the lid in the configuration installed on the vehicle.

The edge is therefore part of the lid and is shaped to match the outside of the lower frame.

Looking at the side of the vehicle, the visible part will therefore be the edge of the lid and the detachment line between the frame and the lid.

An aim of the described embodiments is therefore to provide a liftable roof for recreational vehicles which is able to overcome the drawbacks of the prior art.

Another aim of the described embodiments is to provide a liftable roof for recreational vehicles which can be obtained by means of a simple, fast and inexpensive production process.

A further aim of the described embodiments is to provide a liftable roof for recreational vehicles having a considerable thermal and acoustic insulation capacity, in particular with regard to the upper lid.

According to the described embodiments, these aims and others are achieved by a liftable roof for recreational vehicles having the technical features described in the appended claims.

BRIEF DESCRIPTION OF THE DRAWINGS

The technical features of the described embodiments, with reference to the above-mentioned aims, are clearly described in the appended claims and its advantages are apparent from the detailed description which follows, with reference to the accompanying drawings which illustrate a purely non-limiting example embodiment of the described embodiments, in which:

DETAILED DESCRIPTION

Figure 1:
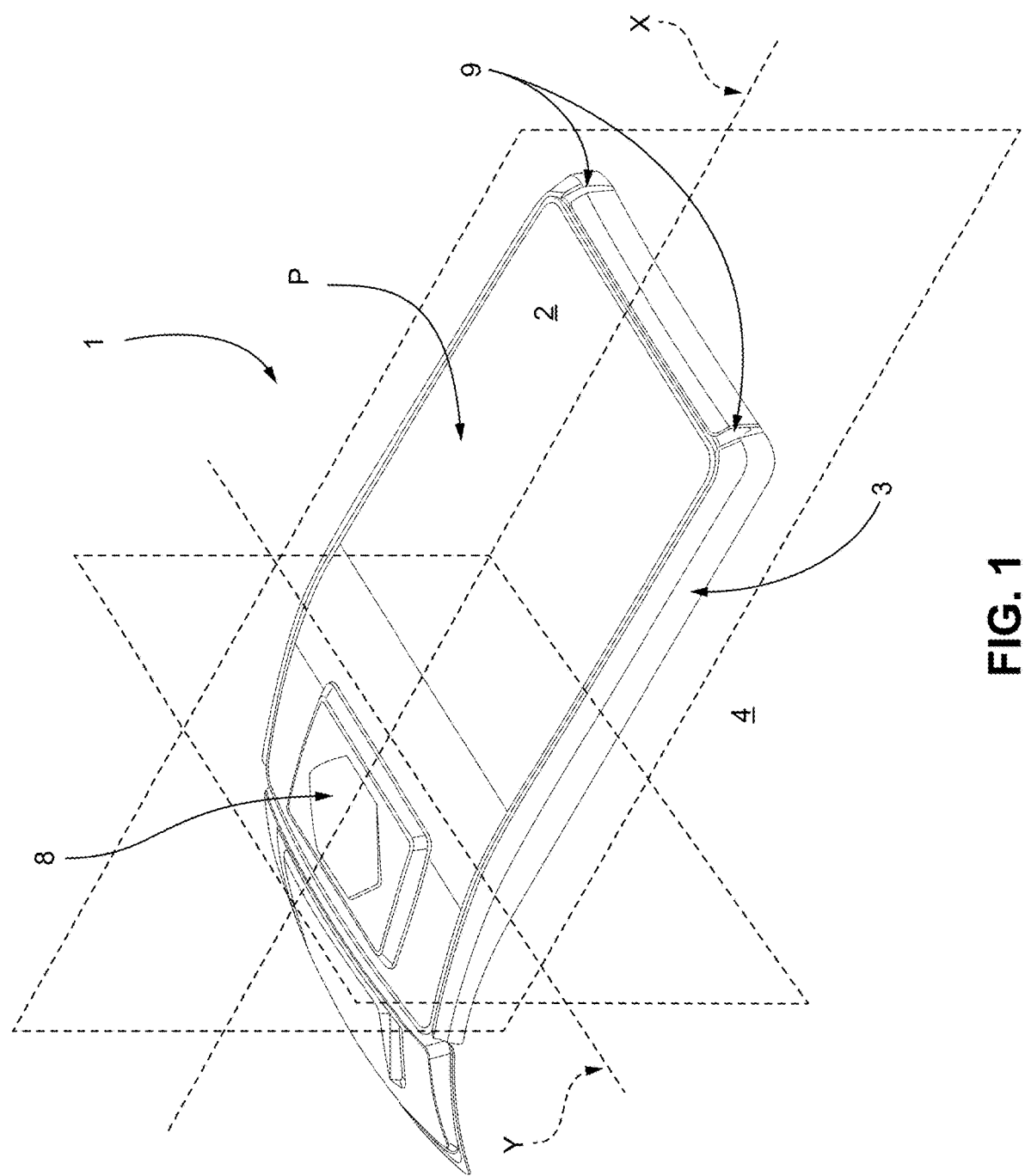
FIG. 1 shows a first axonometric schematic view of a liftable roof according to the described embodiments in a first non-operating configuration of use.

With reference to the accompanying drawings, the numeral 1 denotes in its entirety a liftable roof for recreational vehicles 4 made in accordance with the described embodiments, hereinafter also referred to simply as the device 1.

The liftable roof 1 for recreational vehicles 4 according to the described embodiments comprises a lower frame 3 stably connectable to the upper surface of the recreational vehicle 4 (that is to say, the surface of the original van roof), handling means 6 connected to the lower frame 3 and an upper lid 2 operatively connected to the handling means 6.

The handling means 6 are therefore fixed both to the lower frame 3 and to the upper lid 2 and are interposed between them.

The handling means 6 are configured to move the upper lid 2 with respect to the frame 3 between a first lowered position (shown in the drawings) and a second raised position (not shown in the drawings).

In the second raised position the lid 2 may be positioned substantially parallel to the lower frame 3 (concertina-like opening) or inclined with respect to it, that is to say, with one side of the lid 2 which remains substantially in contact with the respective side of the lower frame 3 (compass-type opening).

The handling means 6 comprise lever mechanisms, for example four-bar linkages, or tie rods and/or springs.

The upper lid 2 is kept in the lowered non-operating position by locking means, such as, for example, handles or hinges, not shown in the drawings.

The upper lid 2 is kept in the raised position by the mechanical action of the handling means 6.

Inside the space created when the upper lid 2 is raised with respect to the lower frame 3 the roof 1 according to the described embodiments comprises a mesh 5 for mattresses or any other means suitable for supporting at least one mattress.

A flexible awning, not illustrated in the drawings, is positioned connected both to the upper lid 2 and to the lower frame 3 with the aim of closing laterally the space created.

The upper lid 2 comprises a single panel P which is made from a first resistant upper layer 24, a second layer 25 of thermo-insulating material and a third resistant layer 26 fixed on a lower surface, advantageously on the entire lower surface, of the second layer 25 of thermo-insulating material.

The first layer 24, the second layer 25 and the third layer 26 are fixed to each other in order to create a panel of the "sandwich" type, that is to say, a multi-layer to form a single body.

The above-mentioned layers 24, 25, 26 are fixed by mutual gluing, that is to say, preparing a layer of adhesive interposed between each pair of layers (first 24-second 25 and second 25-third 26).

The layers of adhesive are of the hot-melt type or solvent-based structural glues.

More in detail, the second layer 25 is fixed on a lower surface, advantageously on the entire lower surface, of the first upper layer 24.

The first upper resistant layer 24 is made of one between aluminium, steel sheet, fibreglass, carbon, glass fibres with a matrix of polymers or resins, rock fibres with a matrix of polymers or resins.

The second layer 25 is made of one between insulating wool, expanded polyurethane foam, expanded polyurethane foam, Styrofoam® (polystyrene).

The third layer 26 is made of one between aluminium, steel sheet, fibreglass, carbon, glass fibres with a matrix of polymers or resins, rock fibres with a matrix of polymers or resins, wood, plastic material, fabric.

More in detail, the function of the first layer 24 is that of being the resistant and structural component of the panel P, and, therefore, of the upper lid 2.

The first layer 24 made in this way is able to withstand any impacts coming from the outside and at the same time is not deformable if subjected to the temperature changes which can occur under normal conditions of use.

This feature allows, amongst other things, to overcome a further limit of the prior art, that is to say, giving the possibility to the manufacturer of roofs to provide a roof with black colour.

In effect, it is known that liftable roofs of known type, in particular if made of ABS and PMMA, cannot be produced in black since, if subjected to a medium/long time under direct contact with the sun, they tend to deform in a significant and plastic manner.

The function of the second layer 25 is, in addition to being structural, conferring heat insulating capacity to the upper lid 2.

The function of the third layer 26 is to protect the second thermo-insulating layer 25 against impacts, coming for example from the inside of the vehicle.

Figure 5:
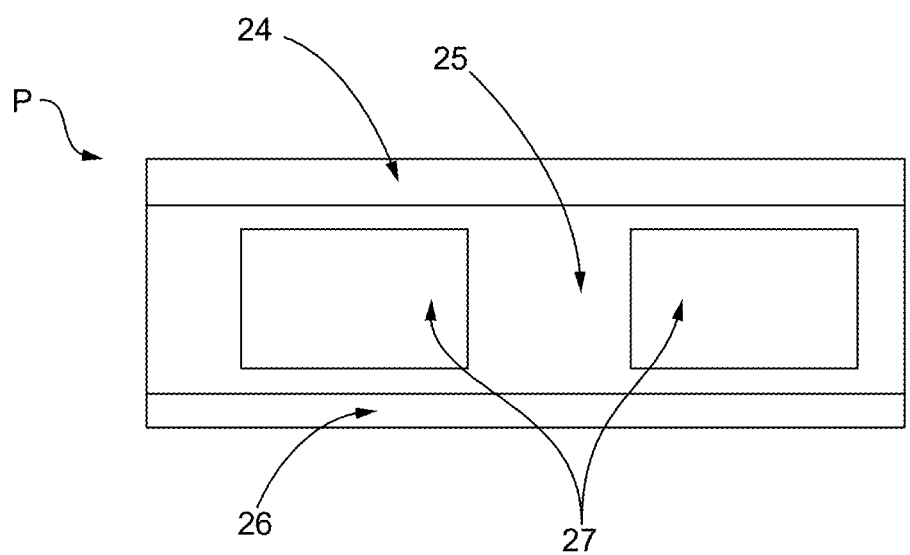
FIG. 5 shows a schematic cross section view of the panel of the upper lid of a roof according to the described embodiments.

Again with reference to FIG. 5, the panel P advantageously comprises at least one stiffening element 27 positioned inside the second layer 25.

The stiffening element 27 is made of one between: PVC, wood, aluminium and is configured not only to give further rigidity to the panel P but also to provide a portion for inserting nails or screws or threads, for example for installing accessories inside or outside the upper lid.

The at least one element 27 may be made in various shapes and sections, such as, for example, ring-shaped frame or bars.

Figure 2:
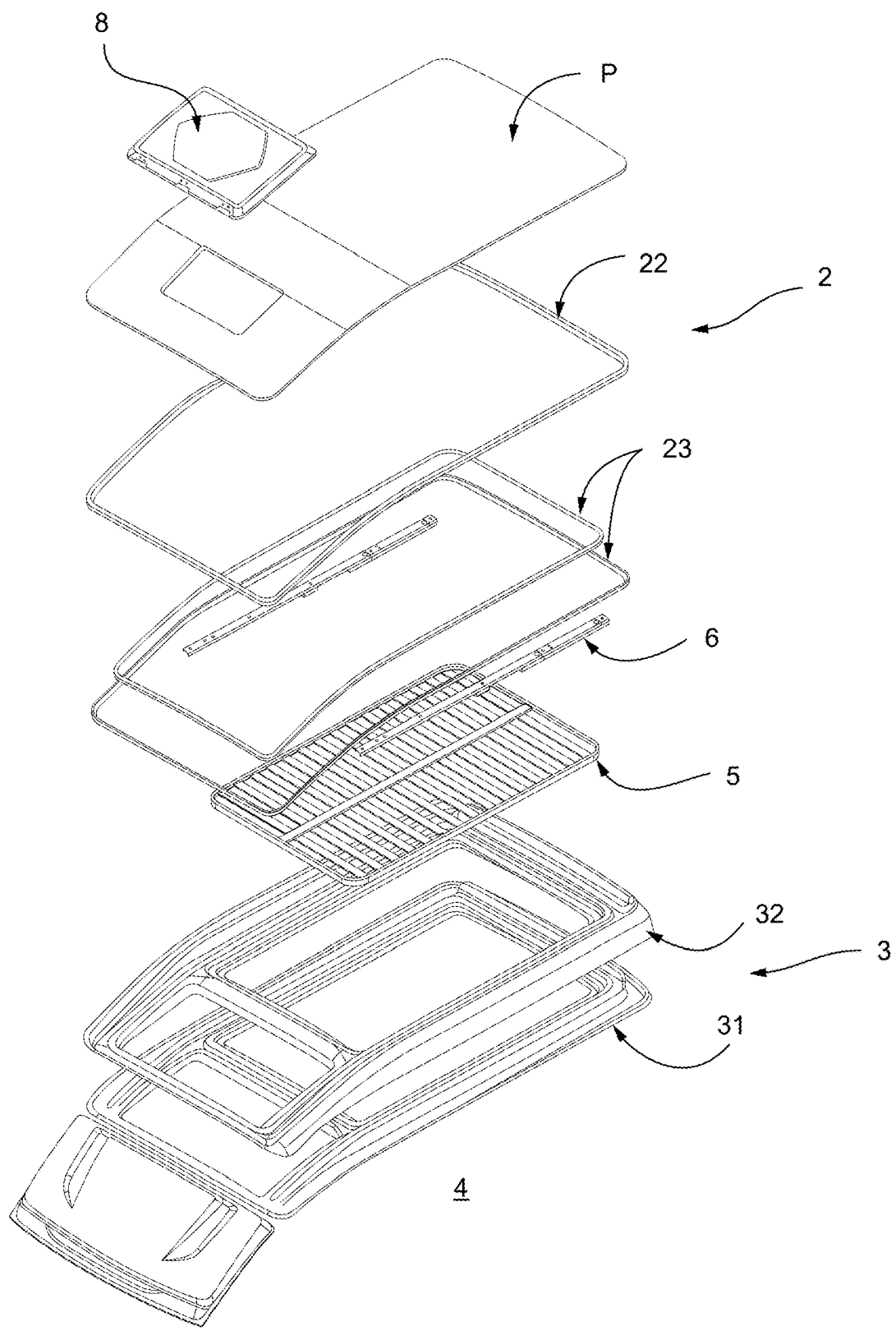
FIG. 2 shows a second exploded axonometric view of the liftable roof of FIG. 1.

An example of an accessory for the outside is shown in FIGS. 1 and 2 in the form of an openable window 8.

Advantageously, the stiffening element 27 is made in the form of a frame partly or completely encapsulated in the thermo-insulating material of the second layer 25.

Advantageously, the total thickness of the panel P is between 1.5 cm and 5 cm.

Such a thickness makes it possible to obtain not only an excellent structural strength of the panel P, and therefore of the entire upper lid 2, but also the ability to tread on the panel by a user.

As shown for example in FIGS. 1 and 2, the panel P has a concave shape.

Advantageously, the concave shape is defined by two planes of curvature perpendicular to each other.

More in detail, with reference to what is shown in FIG. 1, the panel P advantageously has two curvatures, a first curvature along the direction X and a second curvature along the direction Y.

The direction X and the direction Y are substantially perpendicular to each other giving the panel P a dome shape.

Figure 3:
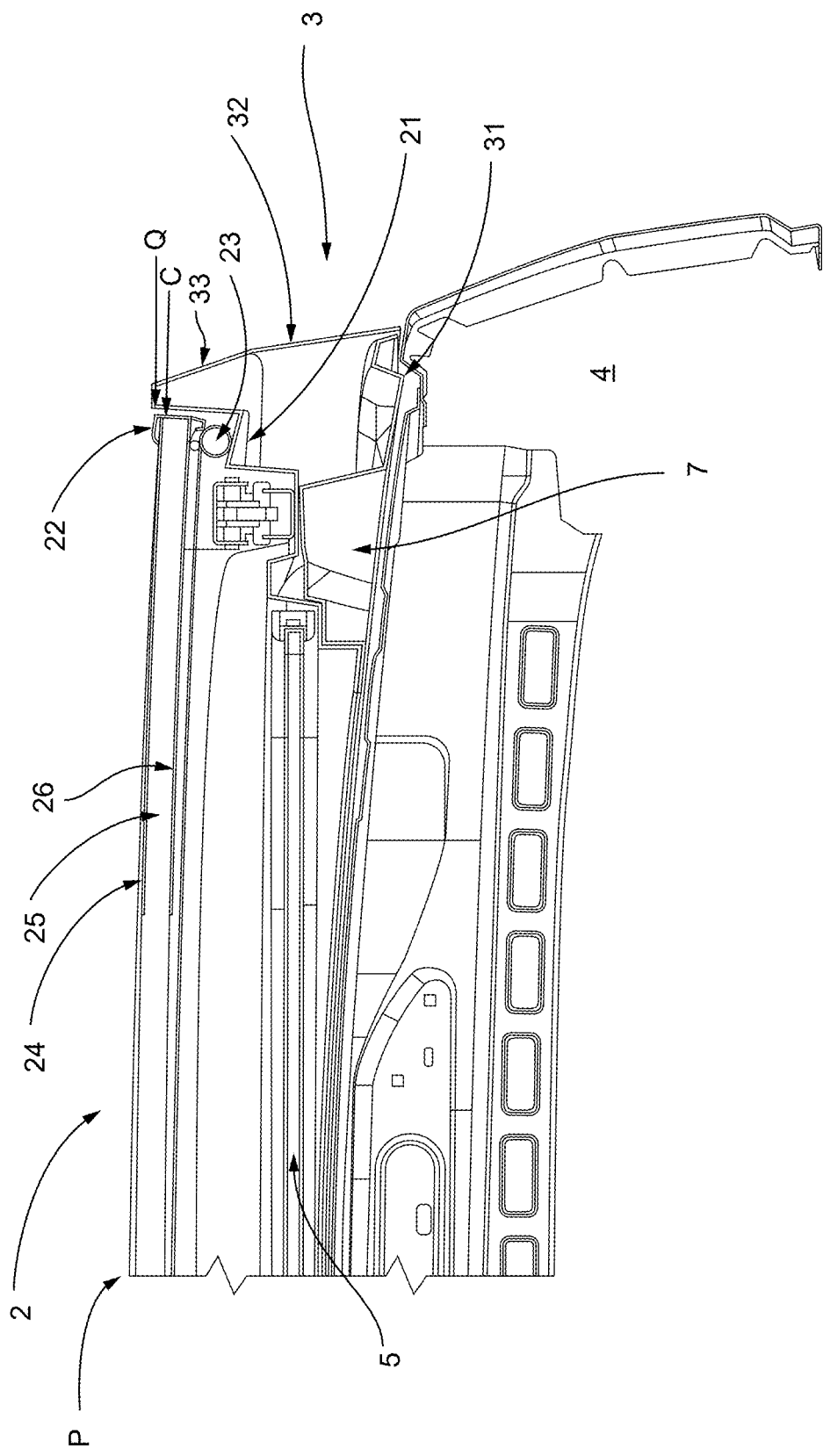
FIG. 3 shows a front cross section view of a detail of the liftable roof according to the described embodiments.
Figure 4:
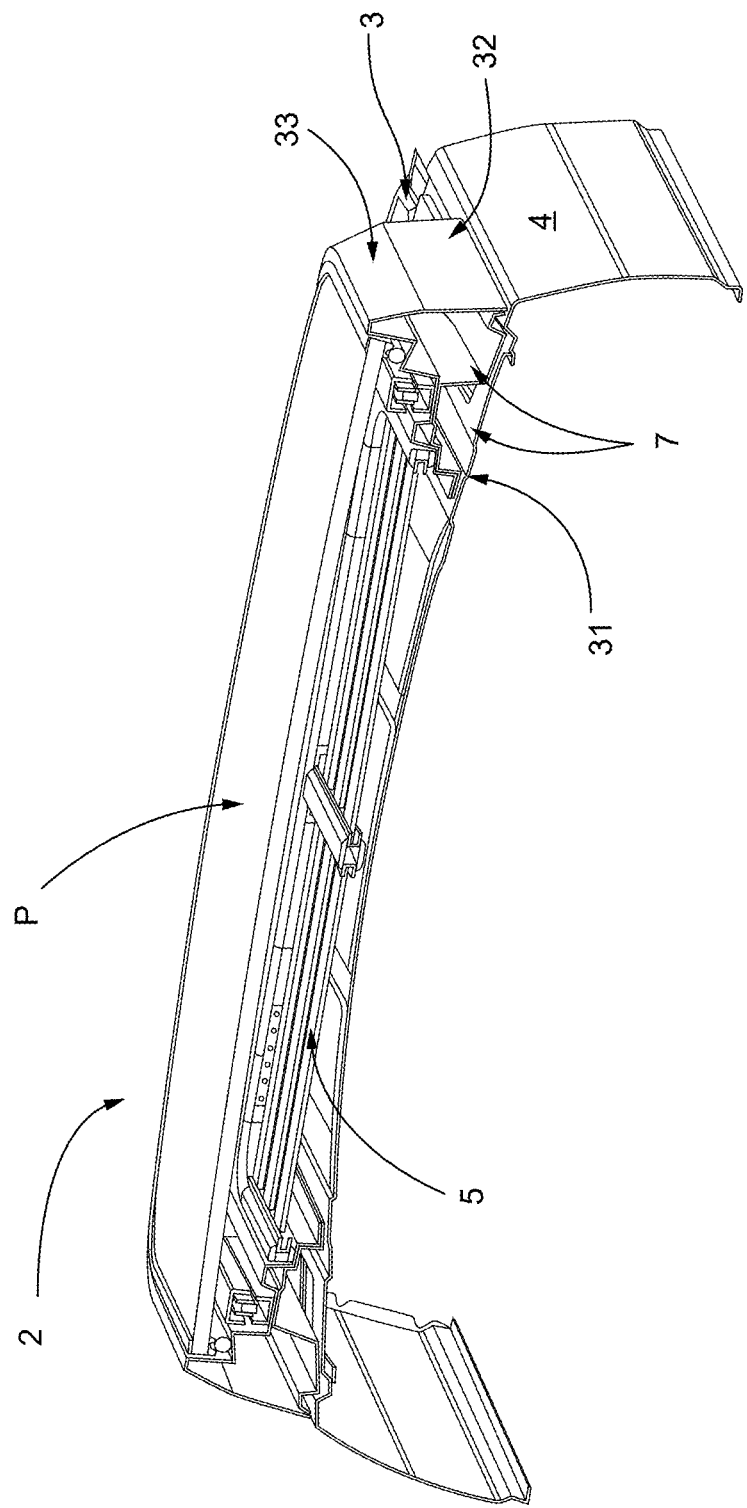
FIG. 4 shows an axonometric cross section view of the roof of FIG. 3.

With reference in particular to FIGS. 3 and 4, the lower frame 3 comprises a first portion 31 configured to be fixed in a non-removable fashion to the upper surface of the recreational vehicle 4 and a second portion 32 stably coupled, for example by heat sealing, to the first portion 31.

The coupling between the first portion 31 and the second portion 32 is such as to generate at least one gap portion 7 in which it is possible to pass service cables and/or aeration ducts for the climate control of the internal space of the roof 1 according to the described embodiments.

With reference to the drawings and in particular to FIG. 3, the second portion 32 of the frame comprises a side edge 33 shaped to match the panel P of the upper lid 2 to surround it externally at least partly on its perimeter edge.

More in detail, the edge 33 is shaped in such a way as to surround externally three sides of the lateral edge of the panel P of the lid 2.

According to embodiments not illustrated, the edge 33 surrounds all four sides of the lateral edge of the panel P of the lid 2.

More in detail, the edge 33 extends in height by a height Q at least equal to the height C at which the panel P of the upper lid 2 is located when it is in the first lowered non-operating position.

In short, the edge 33 of the lower frame 3 extends in height to cover the panel P in such a way that an observer positioned to the side of the vehicle on the ground plane where the vehicle 4 lies is unable to see the lateral edge of the panel P and only sees the outer lateral surface of the second portion 32 of the frame.

This technical solution allows, as well as obtaining a better aesthetic appearance of the side view of the vehicle 4 since it is more uniform and continuous, also an improved aerodynamics of the vehicle 4 preventing the generation of whistles and noises during the motion of the vehicle 4 at moderate and high speeds.

In effect, overall, the lateral surface of the vehicle 4 has at least one discontinuity line (between the lid and the frame) less than the prior art roofs generating less turbulence and, therefore, less noise and aerodynamic resistance.

According to embodiments not shown in the drawings, the function of the edge 33 is shown on the upper lid 2.

According to these embodiments, the roof comprises an edge element which is fixed directly to the upper lid 2.

More in detail, the edge element is advantageously fixed to the entire perimeter, that is to say, the lateral edge, of the upper lid 2.

The function of the edge element is the same as that provided by the edge 33 when present in the second portion 32 of the lower frame 3.

As shown in the detail of FIG. 3, in order to prevent the entrance of water, for example rain, inside the vehicle 4, the upper lid 2 advantageously comprises a frame 22 and a seal 23 configured to enter into contact with a respective protrusion 21 made on the portion 31 of the lower frame 3.

Since the sealing force of the seal 23 on the protrusion 21 is vertical, it provides maximum reliability, in fact it uses the closing force of the lid 2 on the frame 3 applied by the user.

Advantageously, the frame 22 is also made of soft material and designed to act as a gasket.

The frame 22 is designed to protrude at least until contact with the inner surface of the edge 33.

The liftable roof 1 also advantageously comprises a system 9 for draining water which reaches the lower frame 3.

The drainage system 9 advantageously comprises ducts and holes configured to convey the water towards the sides of the vehicle 4, that is to say, on the side opposite the space created by the liftable roof 1.

Advantageously, the ducts are made on the second portion 32 of the lower frame 3.

Advantageously, the drainage system 9 comprises portions for escape of the water positioned in the rear portion (that is to say, the one positioned above the rear of the vehicle 4) of the second portion 32 of the frame 3.

When the vehicle 4 is moving, this positioning makes it possible to maximise and facilitate the escape of the water using also the acceleration of the vehicle 4 which tends to push out the water in the opposite direction to that of forward movement.

The liftable roof for recreational vehicles according to the described embodiments achieves the preset aims and brings important advantages.

A first important advantage consists in the fact that a liftable roof according to the described embodiments can be made with a production process which is much faster, cheaper and more reliable than that of the prior art roofs in which the upper lid consists of two mutually heat-sealed mouldings.

A second advantage of a roof according to the described embodiments is the fact that with the same mechanical characteristics the panel P is much lighter than the prior art heat-sealed lid.

A further advantage consists in the fact that, since the panel P is not susceptible to deformations due to temperature changes, it is possible to also produce the liftable roof with dark colours, such as black, without the risk of deformation during use which could adversely affect the working life of the roof 1.

A further advantage is that a roof according to the described embodiments makes it possible to obtain a substantial reduction in whistling and noise during the movement of the vehicle 4 (therefore certainly with the roof 1 in the closed position) thanks to a greater uniformity and continuity of the lateral face of the roof 1, that is to say, thanks to the presence of the edge 33 made on the frame 3 and shaped to match outside the lid 2.

The invention claimed is:

1. A liftable roof for recreational vehicles comprising:
   an upper lid covering an opening made in an upper surface of said recreational vehicle, a lower frame stably connectable to said upper surface of said recreational vehicle, handling means interposed and operatively connected to said upper lid and to said lower frame, said handling means being configured for moving said lid with respect to said frame between a first lowered position and a second raised position, said upper lid comprising a single panel and said panel comprising a first resistant upper layer and a second layer made of thermo-insulating material fixed on a lower surface of said first upper layer and a third resistant layer fixed to a lower surface of said second layer made of thermo-insulating material, wherein said lower frame comprises a first portion configured to be fixed to the upper surface of said recreational vehicle and a second portion stably coupled to said first portion, said second portion comprising a lateral edge shaped to match said panel (P) of said upper lid to surround it externally at least partly on its perimeter edge, and wherein said edge extends in height by a height at least equal to the height at which said panel of said upper lid is located when said lid is in said first lowered position.

2. The roof according to claim 1, wherein said first layer is fixed to said second layer by hot-melt type adhesives or solvent-based structural glues.

3. The roof according to claim 1, wherein said third layer is fixed to said second layer by hot-melt type adhesives or solvent-based structural glues.

4. The roof according to claim 1, wherein said first upper layer is made of one between aluminum, steel sheet, fibreglass, carbon, glass fibres with a matrix of polymers or resins, rock fibres with a matrix of polymers or resins.

5. The roof according to claim 1, wherein said second layer is made of one between insulating wool, expanded polyurethane foam, expanded polyurethane, Styrofoam®.

6. The roof according to claim 1, wherein said third layer is made of one between aluminum, steel sheet, fibreglass, carbon, glass fibres with a matrix of polymers or resins, rock fibres with a matrix of polymers or resins, wood, plastic material, fabric.

7. The roof according to claim 1, wherein said panel further comprises at least one stiffening element positioned inside said second layer.

8. The roof according to claim 1, wherein said at least one stiffening element is made of one between PVC, wood, aluminium.

9. The roof according to claim 1, wherein said panel has a total thickness of between 1.5 cm and 5 cm.

10. The roof according to claim 1, wherein said panel has a concave shape.

11. The roof according to claim 1, wherein said concave shape is defined by two planes of curvature perpendicular to each other.

12. The roof according to claim 11, further comprising a water drainage system made on said second portion of said lower frame.

* * * * *